United States Patent [19]

Walton

[11] Patent Number: 5,051,493

[45] Date of Patent: Sep. 24, 1991

[54] METAL PHTHALOCYANINES AS CATALYSTS FOR CURING PHTHALONITRILE PREPOLYMERS

[75] Inventor: Theodore R. Walton, Annandale, Va.

[73] Assignee: The United States of America as represented by the Secretary of the Navy, Washington, D.C.

[21] Appl. No.: 531,423

[22] Filed: May 31, 1990

[51] Int. Cl.$^5$ .............................................. C08G 83/00
[52] U.S. Cl. .................................... 528/362; 528/206; 528/207; 528/208; 528/210; 528/271; 528/360
[58] Field of Search ............... 528/362, 271, 206, 207, 528/208, 210, 360

[56] References Cited

U.S. PATENT DOCUMENTS

| | | | |
|---|---|---|---|
| 3,996,196 | 12/1976 | D'Alello | 260/47 |
| 4,116,945 | 9/1978 | Griffith et al. | 528/362 |
| 4,209,458 | 6/1980 | Keller et al. | 260/465 |
| 4,226,801 | 10/1980 | Keller et al. | 260/465 |
| 4,234,712 | 11/1980 | Keller et al. | 528/9 |
| 4,238,601 | 12/1980 | Keller et al. | 528/206 |
| 4,259,471 | 3/1981 | Keller et al. | 528/9 |
| 4,304,896 | 12/1981 | Keller et al. | 528/9 |
| 4,315,093 | 2/1982 | Keller et al. | 528/362 |
| 4,351,776 | 9/1982 | Keller et al. | 260/465 |
| 4,408,035 | 10/1983 | Keller | 528/183 |
| 4,409,382 | 10/1983 | Keller | 528/173 |
| 4,410,676 | 10/1983 | Keller | 528/9 |
| 4,499,260 | 2/1985 | Achar et al. | 528/229 |
| 4,587,325 | 5/1986 | Keller | 528/172 |
| 4,619,986 | 10/1986 | Keller | 528/99 |
| 4,769,493 | 9/1988 | Ito et al. | 562/480 |

*Primary Examiner*—Harold D. Anderson
*Attorney, Agent, or Firm*—Thomas E. McDonnell; Barry A. Edelberg

[57] ABSTRACT

Bis-phthalonitrile resins are cured using ionic metal phthalocyanine accelerators. The ionic metal phthalocyanines are nontoxic and accelerate the cure rate of the resins without adversely affecting cured polymer strength. Di-Na, di-Li, Mg and Cd phthalocyanines in particular provide excellent cure acceleration. Also, the metal phthalocyanine can be made soluble in the resin by appropriate substitution of the aromatic rings, thus providing for homogenous polymerization.

18 Claims, No Drawings

METAL PHTHALOCYANINES AS CATALYSTS FOR CURING PHTHALONITRILE PREPOLYMERS

BACKGROUND OF THE INVENTION

1. Field of the Invention

The present invention relates generally to metal phthalocyanines and more specifically to metal phthalocyanines useful as catalysts and metal interchange sources for curing phthalonitrile prepolymers.

2. Description of the Prior Art

Bis-phthalonitrile resins are known to form thermally stable polymers. Depending on the structure of the prepolymer, however, the resins may be extremely slow in curing to the polymeric state. In general, electron donating groups on the phthalonitrile ring will slow down the cure reaction.

It is not always possible to increase the temperature to accelerate the cure rate because the prepolymer may volatilize or decompose before polymerizing. Further, the higher temperatures result in a less practical processing environment. Currently, a hydrogen source (such as an amine or alcohol) is added to the resin to accelerate or catalyze the cure to more practical times. However, the hydrogen source can present problems; they can partially volatilize during vacuum degassing of the resin and thus change the cure rate and polymer properties. Further, since these accelerators remain in or become a part of the polymer structure, they may compromise the ultimate thermal stability of the system. Finally, the more practical accelerators are aromatic amines which are known to be cancer causing.

Metals may also accelerate the polymerization of bis-phthalonitriles. Because of the higher density of the metals compared to the resin, however, the metals settle out when the resin melts and thus give non-uniform cures and materials.

SUMMARY OF THE INVENTION

Accordingly, it is an object of this invention to accelerate the polymerization of bis-phthalonitrile prepolymers.

It is another object of this invention to accelerate the polymerization of bis-phthalonitrile prepolymers without adversely affecting the strength of the cured polymer product.

It is a further object of this invention to accelerate the polymerization of bis-phthalonitrile prepolymers with nontoxic catalysts.

It is yet another object of this invention to uniformly cure bis-phthalonitrile prepolymers at an accelerated rate.

These and additional objects of the invention are accomplished by the use of ionic metal phthalocyanines as accelerators in the curing of bis-phthalonitrile prepolymers.

DESCRIPTION OF THE PREFERRED EMBODIMENTS

The metal phthalocyanines useful as catalysts and/or metal interchange sources for accelerating the cure of bis-phthalonitrile prepolymers must have an ionic metal in the ring cavity. Through the specification and the claims that follow, such a metal phthalocyanine is referred to as an "ionic metal phthalocyanine". An ionic metal phthalocyanine is defined in the present specification and the claims that follow as a metal phthalocyanine that, when subjected to dilute acid has its metal replaced with two hydrogen atoms to give metal-free dihydro phthalocyanine. The lower the Ph required for replacement of the metal, the less ionic (more stable) the metal phthalocyanine.

The relative instability of the metal phthalocyanine is related to the catalytic activity; that is, the more easily the metal can be replaced, the faster the gel/cure time. For example, the disodium phthalocyanine is more reactive than the beryllium phthalocyanine. Examples of effective metal phthalocyanines are di-Na, di-Li, Mg and Cd phthalocyanine. Examples of metal phthalocyanines that are stable and do not catalyze the polymerization are Cu-, Ni- and Co- phthalocyanine. In addition, if the metal phthalocyanine has appropriate organic substituents on the peripheral aromatic rings, such as alkyl, aryl, alkylbenzenes, alkoxy, alkylphenoxy, polyether, etc., the metal phthalocyanine will be soluble in the resin and provide a homogeneous polymerization.

The preferred ionic metal phthalocyanine accelerators according to the present invention have the following general formula:

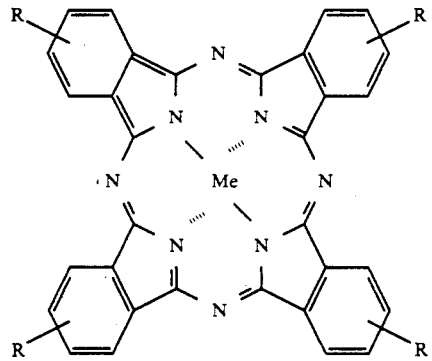

where Me is a replaceable metal and R is an organic substituent, such as an aliphatic group, as will be illustrated later. Preferably, R is selected to increase the solubility of the ionic metal phthalocyanine accelerator in the bis-phthalonitrile resin.

Generally, the solubility of the accelerator in the resin increases with the length and hydrophobicity of the R side chain. In any event, once sufficient solubility occurs for catalytic activity, further solubility is of negligible, if any, consequence. Additionally, the electronic characteristics of the R side chain can influence, in a known manner, the replaceability of Me by H in the accelerator. Nevertheless, the electronic influence of R is far less important than its solubility effects and it may be useful to sacrifice electronic characteristics in favor of desirable solubility effects when selecting R.

For simple (i.e., nonpolymeric) metal phthalocyanines, the resin and catalyst can be mixed together without solvent by grinding or other appropriate methods to form a meltable powder. The mixture is then added to the mold for processing. For substituted metal phthalocyanines soluble in the prepolymer and for metal phthalocyanines which are mutually soluble in a solvent system with the prepolymer, the catalyst and resin can be dissolved in a suitable solvent and the solvent dried to form the meltable powder. For substituted metal phthalocyanines soluble in the prepolymer, the resin can be heated to its melting point and the catalyst dissolved in the melt, then the cure continued at the appropriate temperature. Other methods may also be used for grinding, mixing and dissolving.

Up to a point, the addition of more of the ionic metal phthalocyanine accelerators decreases the cure time of the bis-phthalonitrile prepolymer. Beyond that point, addition of further metal phthalocyanine accelerator fails to increase the cure rate. Typically, in amounts above 50 weight percent based on the total weight of the prepolymer and metal phthalocyanine accelerator, the accelerator may also act as a filler, potentially compromising some properties of the final polymer product, although the presence of filler may enhance other properties. Preferably, as a matter of economy, the metal phthalocyanine accelerator constitutes no more than about 10 weight percent of the total weight of the prepolymer and metal phthalocyanine accelerator if a final product having those properties generally expected for a bis-phthalonitrile resin is desired.

The curing temperature should be one which is typically used to cure the bis-phthalonitrile prepolymer. Generally, higher temperatures increase the cure rate. If the cure temperature is too high, however, the polymer, prepolymer and/or metal phthalocyanine accelerator may decompose. Accordingly, the prepolymer is usually cured at a temperature between the melting point and decomposition temperature of the components of the cure system. Typically, the cure temperature ranges from about 160° to 250° C.

The method of the present invention will accelerate the curing of any bis-phthalonitrile resin. Preferably, the bis-phthalonitrile resin cured according to the present invention is, or is produced by polymerization of, one or more monomers of the following general formula:

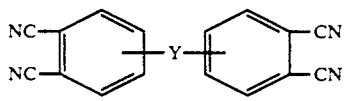

where y is an organic linking group such as -N=CH-Ar-CH=N-, -O-Ar-O-, -S-Ar-S-, =HNC(O)-Ar-O-Ar-C(O)-O-, -O-C(O)-R$_1$-C(O)-O-, -CH$_2$CH$_2$CH$_2$CH$_2$CH$_2$-, etc., where Ar is an aromatic ring system such as phenylene, bisphenylene or naphthalene, and R$_1$ is an aliphatic chain such as -(CH$_2$)$_n$, where n=1 to 16. The effect of R$_1$ and Ar on prepolymer and monomer properties, as well as on cured bis-phthalonitrile polymers, has been well documented in the art.

While the exact mechanism by which the ionic metal phthalocyanine accelerates curing is not known (and it is not desired to be bound by theory), one or more of several possible mechanisms may be proposed. The close match of the metal phthalocyanine to the density of the bis-phthalonitrile resin melt may reduce the settling and separation which occurs when bis-phthalonitriles are cured using metal particles. Also, the metal phthalocyanine may complex with unpolymerized bis-phthalonitrile. The metal could be mobile within the thus formed rings, thereby enhancing the curing process by a mechanism similar to ion exchange involving the phthalonitrile and phthalocyanine ring structures of the complex. Further, the metal phthalocyanine may act as a polymerization template. Additionally, in the case of soluble phthalocyanines, the distribution of the metal within the final polymer will be extremely uniform. The more uniform the distribution of metal remaining in the final polymer, the lower the possibility that a large amount of metal will concentrate in one location and adversely alter the properties of the final polymer.

Having described the invention, the following examples are given to illustrate specific applications of the invention including the best mode now known to perform the invention. These specific examples are not intended to limit the scope of the invention described in this application.

EXAMPLES

Table 1 illustrates the effect of disodium phthalocyanine on gelation time of N,N'-bis(3,4-dicyanophenyl) decanediamide, a resin of intermediate reactivity. In this example, the phthalocyanine and resin were ground together using a mortar and pestle. The well mixed powder was placed in a mold and melt cured at the indicated temperature.

TABLE I

| (Temp. 215° C.) | | |
|---|---|---|
| 0% Na$_2$Pc | 0.9% Na$_2$Pc | 6.4% Na$_2$Pc |
| gel time | 2 hrs 45 min | 2 hrs 30 min | 45 min |

Table 2 illustrates the effect of disodium phthalocyanine on gelation of N,N'-terephthalylidene-bis(3,4-dicyanoaniline) (a reactive resin). The procedure was the same as in Example 1, except the cure temperature was 290° C.

TABLE 2

| (Temp. 290° C.) | | |
|---|---|---|
| 0% Na$_2$Pc | 1% Na$_2$Pc | 9% Na$_2$Pc |
| gel time | 45 min | 6 min | 3 min |

Table 3 illustrates the catalytic effect of disodium phthalocyanine on the gelation time of 2,2-bis[4-(3,4dicyanophenoxy)phenyl]propane (a low reactive resin) using the procedure described in Example 1.

TABLE 3

| (Temp. 200° C.) | |
|---|---|
| 0% Na$_2$Pc | 8% Na$_2$Pc |
| gel time | 4 days | 4–16 hrs |

Table 4 compares the gel time of the above resin without catalyst, and with copper, magnesium, and disodium phthalocyanine.

TABLE 4

| | (Temp. 211-224° C.) | | | |
|---|---|---|---|---|
| | 0% Pc | 8% CuPc | 8% MgPc | 8% Na$_2$Pc |
| gel time | 4 days | 3 days, 8 hrs | 16 hrs | 10 hrs |

Table 5 illustrates the effect of a soluble metal phthalocyanine, Be tetraphenoxy phthalocyanine, on the gelation time of the above resin. In this example, the phthalocyanine was dissolved in the melted resin with stirring.

TABLE 5

| | (Temp. 209-215° C.) | |
|---|---|---|
| | 0% Pc | 5% BePcTP |
| gel time | 4 days | 18 hrs |

The present invention has several advantages over the prior art. For example, the present method cures bis-phthalonitrile resins at much greater rates than previously possible. Also the ionic metal phthalocyanine accelerators used can be nontoxic, thermally stable and do not, if used as described above, compromise the stability of the final polymer. By selecting an appropriate ionic metal phthalocyanine, a completely homogenous solution cure is possible, providing a final polymer with uniform properties. Additionally, the reactivity of the accelerator can be controlled by selecting the type of metal contained in the phthalocyanine.

Obviously, many modifications and variations of the present invention are possible in light of the above teachings. It is therefore to be understood that, within the scope of the appended claims, the invention may be practiced otherwise than as specifically described.

What is claimed is:

1. A method of curing a bis-phthalonitrile resin comprising the steps of:
   mixing a bis-phthalonitrile resin with an ionic metal phthalocyanine in an amount effective to accelerate the cure of said bis-phthalonitrile;
   melting said mixture;
   subjecting said melted mixture to polymerization temperatures until said mixture has polymerized to provide a polymer having the desired degree of polymerization.

2. The method of claim 1, wherein said metal phthalocyanine is an alkali metal phthalocyanine or an alkaline earth metal phthalocyanine.

3. The method of claim wherein said metal phthalocyanine comprises no more than about 50 percent of said mixture based on the combined weight of said metal phthalocyanine and said bis-phthalonitrile.

4. The method of claim 3, wherein said metal phthalocyanine comprises at least one weight percent of said mixture based on the combined weight of said metal phthalocyanine and said bis-phthalonitrile.

5. The method of claim 4, wherein said metal phthalocyanine comprises no more than about 10 percent of said mixture based on the combined weight of said metal phthalocyanine and said bis-phthalonitrile.

6. The method of claim 1, wherein said mixture is cured at from 160° to 250° C.

7. The method of claim 1, wherein said ionic metal phthalocyanine is soluble in said bis-phthalonitrile resin.

8. The method of claim 1, wherein said mixing comprises dissolving said metal phthalocyanine and said bis-phthalonitrile in a solvent system and evaporating the solvent.

9. The method of claim 1, wherein said mixing is performed in the absence of solvent.

10. The method of claim 1, wherein said ionic bis-phthalocyanine has the structure:

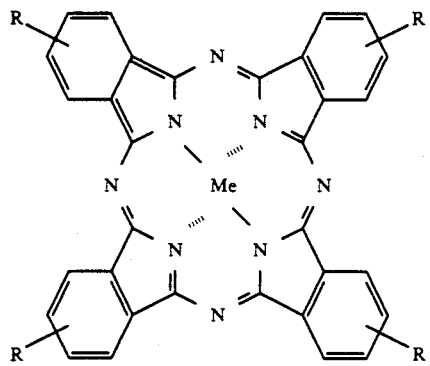

where Me is a replaceable metal and R is an organic substituent.

11. The method of claim 10, wherein Me is a di-alkali metal or alkaline earth metal.

12. The method of claim 11, wherein Me is di-Na, di-Li, Mg or Cd.

13. The method of claim 10, wherein said bis-phthalonitrile resin is produced by the polymerization of at least one monomer having the structure:

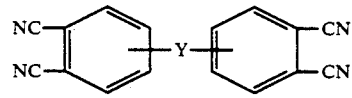

where y is an organic linking group selected from the group consisting of -N=CH-Ar-CH=N-, -O-Ar-O-, -S-Ar-S-, =HNC(O)-Ar-O-Ar-C(O)-O-, -O-C(O)-R$_1$-C(O)-O-, -CH$_2$CH$_2$CH$_2$CH$_2$CH$_2$-, wherein Ar is a substituted or unsubstituted aromatic ring system and R is an aliphatic group.

14. The method of claim 13, wherein R$_1$ is -(CH$_2$)$_n$, where n=1 to 16.

15. A polymerizable mixture comprising a bis-phthalonitrile resin and amount of an ionic metal phthalocyanine effective to accelerate thermal curing of said bis-phthalonitrile.

16. The polymerizable mixture of claim 15, wherein said metal phthalocyanine is an alkali metal phthalocyanine or an alkaline earth metal phthalocyanine.

17. The polymerizable mixture of claim 16, wherein said ionic bis-phthalocyanine has the structure:

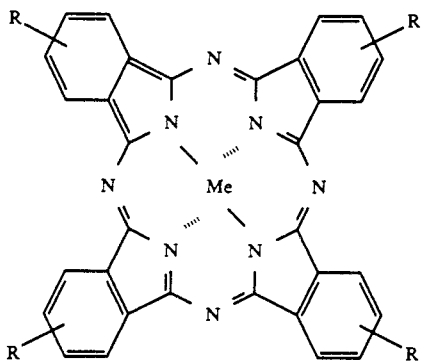

where Me is a replaceable metal and R is an organic substituent.

18. The polymerizable mixture of claim 17, wherein said bis-phthalonitrile resin is produced by the polymerization of at least one monomer having the structure:

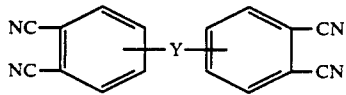

where y is an organic liking group selected from the group consisting of -C=CH-Ar-CH=N-, -O-Ar-O-, -S-Ar-S-, =HCN(O)-Ar-O-Ar-C(O)-O-, -O-C-(O)-R$_1$-C(O)-O-, -CH$_2$CH$_2$CH$_2$CH$_2$CH$_2$-, wherein Ar is a substituted or unsubstituted aromatic ring system and R is an aliphatic group.

* * * * *